United States Patent [19]
Bolanos et al.

[11] Patent Number: 5,793,364
[45] Date of Patent: Aug. 11, 1998

[54] METHOD AND SYSTEM FOR ASSOCIATING PLAYBACK OF MULTIPLE AUDIOVISUAL PROGRAMS WITH ONE GRAPHIC INTERFACE ELEMENT

[75] Inventors: Michael T. Bolanos, New York, N.Y.; Robert B. Currier, San Juan Capistrano, Calif.

[73] Assignee: Entertainment Drive, L.L.C., New York, N.Y.

[21] Appl. No.: 662,243

[22] Filed: Jun. 14, 1996

[51] Int. Cl.$^6$ ............................................. G06F 15/00
[52] U.S. Cl. ............................................ 345/327; 345/302
[58] Field of Search ........................... 395/327, 333, 395/334, 336, 339, 348, 349, 352, 356, 972, 978, 806, 807; 345/122, 146, 327, 333, 334, 336, 339, 348, 349, 352, 356, 972, 978, 302

[56] References Cited

U.S. PATENT DOCUMENTS

| | | | |
|---|---|---|---|
| 4,884,972 | 12/1989 | Gasper | 434/185 |
| 5,017,143 | 5/1991 | Backus et al. | 434/236 |
| 5,235,679 | 8/1993 | Yoshizawa et al. | 345/336 |
| 5,388,993 | 2/1995 | McKiel et al. | 434/118 |
| 5,433,614 | 7/1995 | Beye | 434/307 R |
| 5,504,675 | 4/1996 | Cragun et al. | 705/14 |
| 5,524,195 | 6/1996 | Clanton, III et al. | 345/327 |
| 5,657,462 | 8/1997 | Brouwer et al. | 345/336 |

*Primary Examiner*—Matthew M. Kim
*Assistant Examiner*—Crescelle N. dela Torre
*Attorney, Agent, or Firm*—Fish & Neave; Joseph M. Guiliano; Matthew T. Byrne

[57] ABSTRACT

A method and system are provided for associating playback of multiple audiovisual programs with one graphic interface element in a graphical user interface. Primary and secondary audiovisual programs are associated with the graphic interface element. A primary audiovisual program is played back when the user selects the graphic interface element. The secondary audiovisual program is played back at pseudo-random intervals without user input. The secondary audiovisual program draws the user's attention to the graphic interface element.

48 Claims, 4 Drawing Sheets

FIG. 4

METHOD AND SYSTEM FOR ASSOCIATING PLAYBACK OF MULTIPLE AUDIOVISUAL PROGRAMS WITH ONE GRAPHIC INTERFACE ELEMENT

BACKGROUND OF THE INVENTION

This invention relates to playback of audiovisual programs using a graphical user interface. More particularly, this invention relates to a method and system for associating a single graphic interface element with the playback of a primary audiovisual program and at least one secondary audiovisual program.

The Internet and commercial on-line services have become widely used resources for information relating to a variety of topics including news, finance, education, and entertainment. An increasing number of Internet sites and commercial on-line services are offering information in the form of full-motion audiovisual programs that a user can download from these sites and on-line services to a local computer system, such as a personal computer. The downloaded audiovisual data files may be stored in a mass storage device (e.g., a hard disk drive) in the local computer system for later retrieval by the user when the user desires to view the audiovisual programs.

In order to view a downloaded audiovisual program, the user may invoke a particular type of graphical user interface, commonly known as a "viewer," which resides on the local computer system. This type of interface is capable of reading the audiovisual data files that the user may have downloaded into the local computer system from the Internet or a commercial on-line service. The interface enables the local computer system to display the full-motion video content of a selected audiovisual program on a suitable video monitor. The interface also enables the local computer system to play the audio content of the selected audiovisual program through the local computer's speaker system. Like the audiovisual program data files, viewers are available for users to download from various Internet sites and commercial on-line services.

Despite the widespread acceptance of the Internet and commercial on-line services as valuable information resources, it has been difficult for Internet content providers and many on-line services to generate revenue from the information that they provide. In particular, users of the Internet and on-line services have resisted using "premium" services and utilities which require payment of fees above that which are deemed to be "standard" access fees.

Not surprisingly, many Internet content providers and on-line services have turned to commercial advertising to generate revenue. For example, many Internet content providers and on-line services incorporate still image advertisements into their screen displays. Still image advertisements have had only limited success.

Audiovisual program viewers offer the opportunity to provide full-motion audiovisual advertisements, which are known to be more compelling to users than still images. This, however, is difficult to implement in a way that satisfies both advertisers and users. Advertisers typically need to know that their advertisements are being viewed often enough, and by enough viewers, to justify the advertising expense. Users, on the other hand, do not wish to be burdened with frequent and uncontrolled playback of full-motion advertisements each time they desire to use their audiovisual program viewers. If the graphical interface offered a graphical element (e.g., a "button") that allowed the user to control when an advertisement is played, the user is likely to avoid that button, unless the interface somehow entices the user to select it.

It would be desirable to be able to provide a graphical user interface for playback of audiovisual programs, which entices a user to choose to display an advertisement.

It would also be desirable to be able to provide a graphical user interface for playback of audiovisual programs, which includes a graphic interface element that draws attention to itself.

SUMMARY OF THE INVENTION

It is an object of the present invention to provide a graphical user interface for playback of audiovisual programs, which entices a user to choose to display an advertisement.

It is another object of the present invention to provide a graphical user interface for playback of audiovisual programs, which includes a graphic interface element that draws attention to itself.

In accordance with this invention, there is provided a method for playback of multiple audiovisual programs. The method includes providing a graphical user interface for playback of audiovisual programs. At least one primary audiovisual program and at least one secondary audiovisual program are provided for playback using the graphical user interface. The method also includes providing a graphic interface element in the graphical user interface. The graphic interface element initiates playback of the at least one primary audiovisual program in response to a user input to the graphic interface element. The graphic interface element has an appearance. At least one secondary audiovisual program is associated with the graphic interface element. Playback of the at least one secondary audiovisual program associated with the graphic interface element is initiated, without user input, to supplement the appearance of the graphic interface element.

A system for playback of multiple audiovisual programs is also provided in accordance with the present invention.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

The present invention provides a method and system for associating playback of multiple audiovisual programs with a single graphic interface element (e.g., an "icon" or a "button") that appears on a graphical user interface (i.e., "viewer") screen display. The graphical user interface used in connection with this invention includes functions that may be used to facilitate the playback of full-motion audiovisual programs. For example, the interface may include a function that allows the user to select an audiovisual program from a displayed list of audiovisual programs available for viewing. The interface may also include functions that permit the user to change the content of the displayed list of audiovisual programs, for example, by adding or deleting audiovisual programs from the list of available programs.

The graphical user interface may be used to view full-motion audiovisual programs that can be obtained from a variety of sources. For example, audiovisual programs may be downloaded from Internet sites and commercial on-line services. Audiovisual programs relating to many different topics, including, for example, news, finance, education and entertainment, can be played back using the graphical user interface. In addition to full-motion audiovisual programs, the graphical user interface may also be used to play back other types of audiovisual programs, such as still images, sequences of still images, text and audio programs.

The graphical user interface is also preferably downloadable. To obtain the graphical user interface, the user may log onto an Internet site or a commercial on-line service and request that the interface be downloaded to the user's local computer system. Once the graphical user interface has been downloaded, the user can download and playback audiovisual programs as they become available, without having to repeatedly download the graphical user interface.

The local computer system is preferably a personal computer system that includes sufficient mass storage (such as a hard disk drive) to store the graphical user interface software and audiovisual program data files, and a suitable video monitor and associated video display processing circuitry for displaying full-motion audiovisual programs. The local computer system also preferably includes a suitable speaker system for playing back the audio portions of the audiovisual programs.

In addition to the above-described functions, the graphical user interface used in connection with the present invention advantageously includes a unique graphic interface element that can be associated with the playback of a primary audiovisual program and a secondary audiovisual program. The primary audiovisual program may be, for example, a commercial advertisement, or any other type of audiovisual program that an information content provider would like to draw the user's attention to. The primary audiovisual program is preferably a full-motion audiovisual program; however, other forms of audiovisual programs may be suitable including, for example, still images, sequences of still images, text, and audio programs.

The secondary audiovisual program preferably generates a small, relatively unobtrusive, animated object that appears without user input. The secondary audiovisual program is intended to draw the user's attention to the graphic interface element and to entice the user into selecting the graphic interface element to initiate the playback of the primary audiovisual program.

In a preferred embodiment of the invention, the primary and secondary audiovisual programs associated with the graphic interface element are downloaded with the graphical user interface. In this embodiment, the primary and secondary audiovisual programs are permanently associated with the graphical user interface, thus providing the opportunity for repeated playback of the same primary and secondary audiovisual programs over long periods of time. In an alternative embodiment of the invention, the primary and secondary audiovisual programs may change over time. This may be accomplished, for example, by coupling the primary and secondary audiovisual programs with other audiovisual programs that the user requests to download. Thus, when the user requests a particular audiovisual program, new primary and secondary audiovisual programs may accompany the requested program. In addition, there need not be a one-to-one correspondence between primary and secondary audiovisual programs. For example, more than one secondary audiovisual program may be used to entice the user into selecting a particular primary audiovisual program. Conversely, a single secondary audiovisual program may be associated with the presentation of multiple primary audiovisual programs.

In a preferred embodiment of the invention, the secondary audiovisual program associated with a particular primary audiovisual program changes after the first instance in which the user selects the graphic interface element to play back the primary audiovisual program. For example, the initial secondary audiovisual program may present a generic animated object on the video monitor to draw the user's attention to the graphic interface element. If the user has previously selected the graphic interface element during the current execution of the graphical user interface, a different secondary audiovisual program may be used to display a more enticing animated object. The new animated object may be, for example, a character that appears in a primary audiovisual program.

Figure 1:
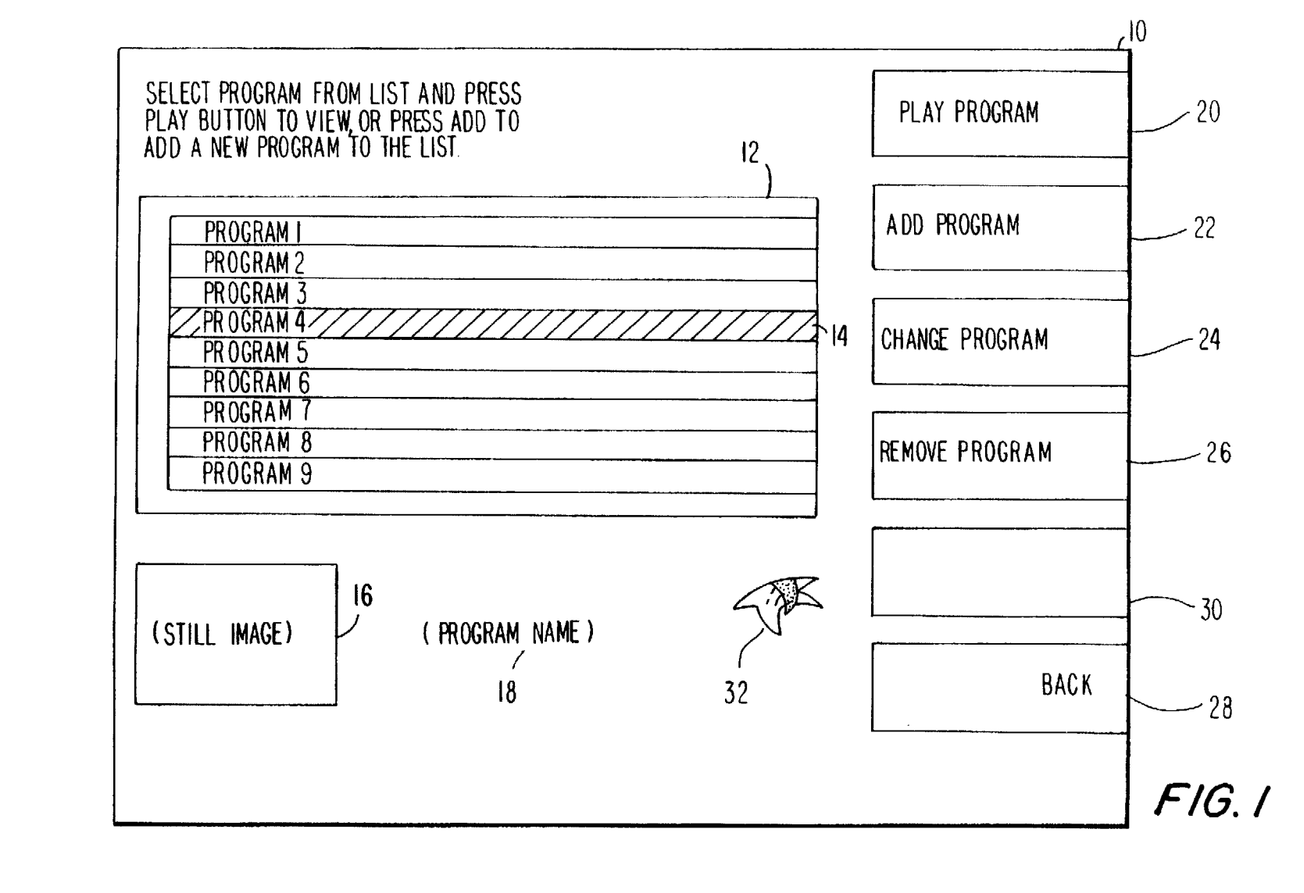
FIG. 1 is an illustrative screen display provided by the graphical user interface of the present invention, which depicts the playback of a secondary audiovisual program associated with a graphic interface element in accordance with the principles of the present invention.

Referring now to the drawings, and in particular FIG. 1, a graphical user interface is described which includes a graphic interface element that is associated with the playback of multiple audiovisual programs in accordance with the principles of the present invention. FIG. 1 depicts an illustrative screen display 10 for facilitating a user's selection of audiovisual programs. The screen display 10 includes a program list 12 that preferably lists the titles of audiovisual programs that are available for the user to choose from.

A selection bar 14 appears within the display list 12 to facilitate selection of an audiovisual program. The selection bar 14 can be moved by the user in a conventional manner, such as through the use of cursor control keys on a keyboard, a mouse, or another suitable pointing/selection device. The selection bar 14 can be used to scroll through the display list 12 if more audiovisual programs are available than can be displayed at once.

The screen display 10 also preferably includes a still image window 16. The still image window 16 displays a still image corresponding to the audiovisual program identified by the current position of the selection bar 14. The still image may aid the user in making an audiovisual program selection. The name of the program identified by the selection bar 14 may appear in a program name field 18.

The screen display 10 also preferably includes a plurality of graphic interface elements which enable the user to interact with the graphical user interface. The graphic interface elements are essentially icons that the user can select using a mouse or other suitable pointing/selection device to perform various functions. For example, an element 20 may be selected by the user to initiate the playback of the program designated by the selection bar 14. An element 22 may be used to add recently downloaded audiovisual programs to the display list 12. An element 24 may be used to change the name of the program designated by the selection bar 14 in order to provide user-customized program titles in the display list 12. An element 26 may be used to remove the program designated by the selection bar 14 from the program list 12. An element 28 may be selected by the user when the user desires to clear the screen display 10 and return to a previous screen (e.g., the screen from which the screen display 10 was invoked).

The screen display 10 further includes a graphic interface element 30 which, in accordance with the principles of the present invention, is preferably associated with at least one primary audiovisual program and at least one secondary audiovisual program. The primary audiovisual program is played back when the user selects the element 30 in a conventional manner (e.g., through the use of a mouse or other suitable pointing/selection device). The secondary audiovisual program is preferably played back without user input.

In a preferred embodiment of the invention, the secondary audiovisual program generates the display of a small, relatively unobtrusive, animated object on the screen display 10, such as the animated object 32. The animated object 32 preferably emerges from beneath the graphic interface element 30, and then moves about the screen display 10. After moving about the screen display 10 for a short while, the animated object 32 preferably moves back to the element 30 to resume its apparent position beneath the element 30.

The animated object 32 is intended to draw the user's attention to the element 30 in order to entice the user into selecting the element 30 to initiate the playback of the primary audiovisual program which may be, for example, a commercial advertisement. Accordingly, the particular pattern of movement of the animated object 32 may be any pattern that is deemed to be appropriate for drawing the user's attention to the element 30. The element 30 may be left unlabeled as shown in FIG. 1, or alternatively it may be labeled with graphics or text as appropriate for a particular application.

The frequency at which the secondary audiovisual program is played back may be chosen to meet the needs of a particular application. In one embodiment of the invention, the secondary audiovisual program is played back at pseudorandomly spaced intervals, each interval having a duration that falls within a prescribed range of acceptable durations.

In an alternative embodiment, three prescribed ranges of intervals are used. In this embodiment, the playback of the secondary audiovisual program is initiated at pseudorandomly spaced intervals having durations that fall within a first prescribed range of durations during the initial display of the program list 12 during the current execution of the graphical user interface. The first prescribed range of durations is preferably from 5 to 15 seconds. A second prescribed range of durations is used when the program list 12 has been previously displayed during the current execution of the graphical user interface, but the user has yet to select the graphic interface element 30. The second prescribed range of durations is preferably from 15 to 45 seconds. A third prescribed range of durations is used when the program list 12 has been previously displayed and the user has previously selected the graphic interface element 30. The third prescribed range of durations is preferably from 30 to 90 seconds.

Figure 2:
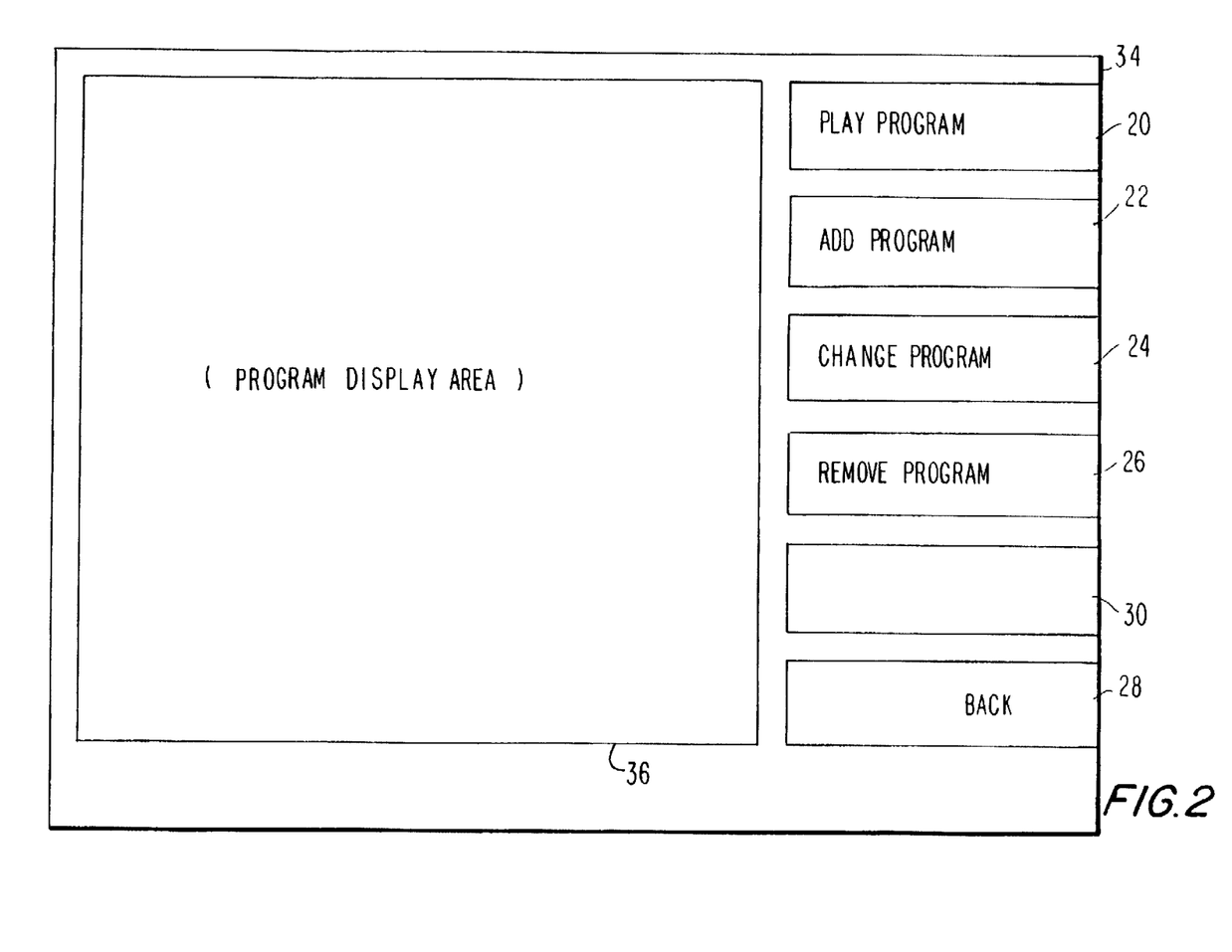
FIG. 2 is another illustrative screen display provided by the graphical user interface of the present invention, which depicts the playback of a primary audiovisual program in accordance with the principles of the present invention.

When the user selects the graphic interface element 30, the screen display 10 is preferably replaced by a screen display 34 shown in FIG. 2. The screen display 34 is similar to the screen display 10 (FIG. 1) except that the program list 12 (FIG. 1), still image window 16 (FIG. 1) and program name field 18 (FIG. 1) are replaced by a program display area 36 within which the primary audiovisual program is presented. The screen display 34 also appears when the user selects an audiovisual program from the program list 12 (FIG. 1)—the selected audiovisual program appearing in the program display area 36. The size of the program display area 36 may vary depending upon the requirements of the particular audiovisual program being played back.

Figure 3:
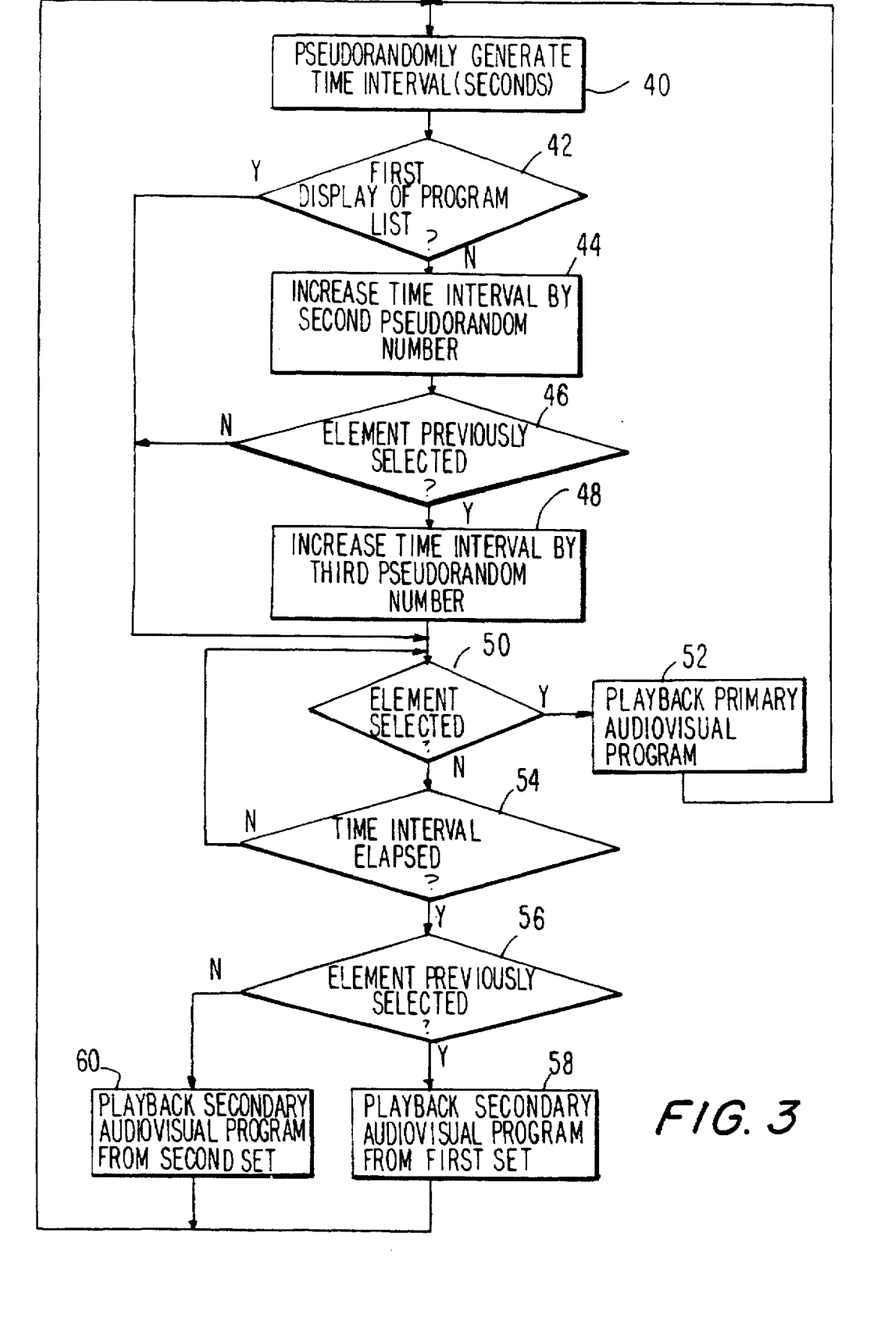
FIG. 3 is a logic flow diagram representing a sequence of processing steps for playing back multiple audiovisual programs in accordance with the principles of the present invention.

Referring now to FIG. 3, a logic flow diagram is described which represents an illustrative sequence of processing steps for implementing playback of multiple audiovisual programs in accordance with the principles of the present invention. The sequence begins with a series of steps that are performed to generate a time interval following which a secondary audiovisual program is displayed. At step 40, the user's computer system generates a pseudorandom number representing a time interval in seconds. The pseudorandom number is preferably in the range from 5 to 15 seconds. At test 42, the system determines if the program list 12 (FIG. 1) is being displayed for the first time during the current execution of the graphical user interface. If the program list 12 (FIG. 1) has not been displayed before, the system proceeds to test 50. Otherwise, the system increases the time interval generated at step 40 by a second pseudorandomly generated number at step 44. The second pseudorandom number is preferably in the range from 0 to 30 seconds.

At test 46, the system determines if the graphic interface element 30 (FIG. 1) has been previously selected by the user during the current execution of the graphical user interface. If the element 30 (FIG. 1) has not been previously selected, the system proceeds to test 50. Otherwise, the time interval is increased by a third pseudorandomly generated number at step 48. The third pseudorandom number is preferably in the range from 15 to 45 seconds.

At test 50, the system checks for selection of the element 30 (FIG. 1) by the user. When the system detects selection of the element 30 (FIG. 1), the system plays back a primary audiovisual program at step 52. After step 52, the user is given the opportunity to return to the screen display 10 (FIG. 1) (e.g., through the use of a button (not shown)) to select audiovisual programs from the program list 12 (FIG. 1). The process of FIG. 3 then restarts at step 40, with logic flow thereafter taking the path dictated by the fact that the element 30 (FIG. 1) was previously selected by the user.

At test 54, the system determines if the time interval generated at step 40, 44 or 48 has elapsed since the time the graphical user interface was invoked by the user or since the last time the secondary audiovisual program was played back (whichever event was more recent). If the time interval has not elapsed, the system loops back to test 50.

If the time interval has elapsed, test 56 is performed to determine if the element 30 (FIG. 1) was previously selected by the user. If the element 30 (FIG. 1) was previously selected, step 58 is performed, where the system initiates the playback of a secondary audiovisual program selected from a first set of secondary audiovisual programs. If the element 30 (FIG. 1) was not previously selected, step 60 is performed, where the system initiates the playback of a secondary audiovisual program selected from a second set of secondary audiovisual programs. Following either step 58 or 60, the system loops back to step 40.

Figure 4:
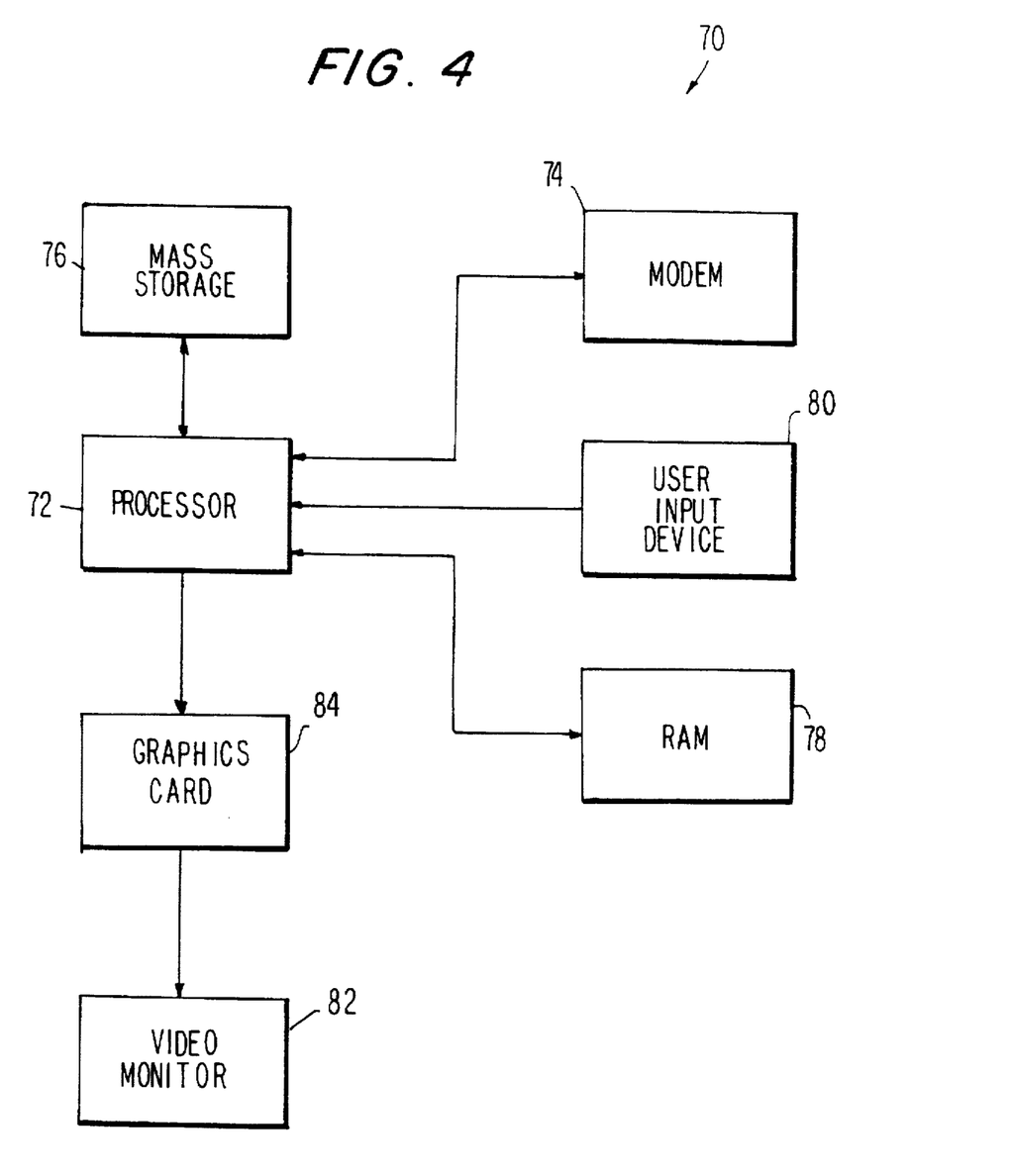
FIG. 4 is a block diagram representing an illustrative embodiment of a hardware platform that may be used to implement playback of multiple audiovisual programs in accordance with the principles of the present invention.

Referring now to FIG. 4, a block diagram is described which represents an illustrative hardware platform that may be used to implement the graphical user interface of the present invention. The components shown in FIG. 4 are preferably conventional components found in typical personal computer systems.

A computer system 70 is controlled by a processor 72, which is preferably a Pentium® microprocessor available from Intel Corporation located in Santa Clara, Calif., or any other suitable microprocessor. A modem 74 preferably having a transmission speed of 28,800 bits per second is coupled to the processor 72 to provide for downloading of audiovisual programs and the above-described graphical user interface software from, for example, the Internet or commercial on-line services. The system further includes a mass storage device 76 for storing, among other things, the audiovisual programs and the graphical user interface software. The mass storage device 76 can be a magnetic, optical, or magneto-optical storage device, or any other suitable storage device.

The system 70 further includes random access memory (RAM) 78 which preferably provides at least 16 MB of storage. A user input device 80 is also included to facilitate the user's interaction with the graphical user interface. The user input device 80 may comprise one or more of a keyboard, mouse, light pen, trackball, microphone and other suitable input devices.

The system 70 further includes a video monitor 82 and a graphics card 84. The video monitor 82 is preferably a conventional SVGA computer monitor having a resolution of at least 640×480 pixels. The video card 84 preferably includes at least 2 MB of video RAM.

Thus a method and system are provided for associating playback of multiple audiovisual programs with one graphic interface element in a graphical user interface. One skilled in the art will appreciate that the present invention can be practiced by other than the described embodiments, which are presented for purposes of illustration and not of limitation, and the present invention is limited only by the claims which follow.

What is claimed is:

1. A method for playback of multiple audiovisual programs, said method comprising the steps of:

providing a graphical user interface for playback of audiovisual programs;

providing at least one primary audiovisual program for playback using said graphical user interface;

providing at least one secondary audiovisual program for playback using said graphical user interface;

providing in said graphical user interface a graphic interface element for initiating playback, in response to user selection of said graphic interface element, of one of said at least one primary audiovisual program;

associating at least one of said at least one secondary audiovisual program with said graphic interface element; and initiating playback, without user input, of said associated at least one of said at least one secondary audiovisual program prior to user selection of said graphic interface element, said associated at least one of said at least one secondary audiovisual program appearing for at least a portion of the playback in a first region of said graphical user interface that is separate from a second region of said graphical user interface in which said graphic interface element appears.

2. The method of claim 1 wherein said initiating step comprises initiating playback based on passage of time.

3. The method of claim 2 wherein said initiating step comprises initiating playback at temporally spaced intervals.

4. The method of claim 3 wherein said temporally spaced intervals are pseudorandomly spaced.

5. The method of claim 4 wherein each of said pseudorandomly spaced intervals has a duration selected from a range of durations.

6. The method of claim 5 wherein there is only one said range of durations, each of said pseudorandomly spaced intervals being selected from said one range of durations.

7. The method of claim 5 wherein:

there are at least two said range of durations;

for an initial one of said pseudorandom intervals occurring after a user first activates said graphical user interface, an initial range of durations is effective; and for subsequent ones of said pseudorandom intervals after said initial one of said pseudorandom intervals, a second range of durations is effective.

8. The method of claim 7 wherein said initial range of durations includes a shorter minimum duration and a shorter maximum duration than said second range of durations.

9. The method of claim 8 wherein:

said initial range of durations includes durations between about 5 seconds and about 15 seconds; and said second range of durations includes durations between about 15 seconds and about 45 seconds.

10. The method of claim 1 wherein:

said step of providing at least one secondary audiovisual program comprises providing a first group of secondary audiovisual programs and a second group of secondary audiovisual programs;

each of said first and second groups of secondary audiovisual programs comprises at least one secondary audiovisual program; and said step of initiating playback without user input comprises (a) playing back a secondary audiovisual program from said first group when said step of initiating playback without user input occurs prior to initiation of playback of said at least one primary audiovisual program in response to user selection of said graphic interface element, and (b) playing back a secondary audiovisual program from said second group when said step of initiating playback without user input occurs after initiation of playback of said at least one primary audiovisual program in response to user selection of said graphic interface element.

11. The method of claim 10 wherein said at least one audiovisual program in said second group comprises content in common with content of said at least one primary audiovisual program.

12. A system for playback of multiple audiovisual programs, said system comprising:

a display for playback of audiovisual programs;

memory for storing at least one primary audiovisual program and at least one secondary audiovisual program;

a graphical user interface generator for creating a graphical user interface on said display for controlling playback of said at least one primary audiovisual program and said at least one secondary audiovisual program, said generator providing in said graphical user interface a graphic interface element for initiating playback, in response to user selection of said graphic interface element, of one of said at least one primary audiovisual program; and a user input device for actuating said graphic interface element for initiating playback of said at least one primary audiovisual program; wherein:

at least one of said at least one secondary audiovisual program is associated with said graphic interface element; and playback of said associated at least one of said at least one secondary audiovisual program is initiated by said generator without user input prior to user selection of said graphic interface element, said associated at least one of said at least one secondary audiovisual program appearing for at least a portion of the playback in a first region of said graphical user interface that is separate from a second region of said graphical user interface in which said graphic interface element appears.

13. The system of claim 12 wherein playback of said associated at least one of said at least one secondary audiovisual program is initiated based on passage of time.

14. The system of claim 13 wherein playback of said associated at least one of said at least one secondary audiovisual program is initiated at temporally spaced intervals.

15. The system of claim 14 wherein said temporally spaced intervals are pseudorandomly spaced.

16. The system of claim 15 wherein each of said pseudorandomly spaced intervals has a duration selected from a range of durations.

17. The system of claim 16 wherein there is only one said range of durations, each of said pseudorandomly spaced intervals being selected from said one range of durations.

18. The system of claim 16 wherein:

there are at least two said range of durations;

for an initial one of said pseudorandom intervals occurring after a user first activates said graphical user interface, an initial range of durations is effective; and for subsequent ones of said pseudorandom intervals after said initial one of said pseudorandom intervals, a second range of durations is effective.

19. The system of claim 18 wherein said initial range of durations includes a shorter minimum duration and a shorter maximum duration than said second range of durations.

20. The system of claim 19 wherein:

said initial range of durations includes durations between about 5 seconds and about 15 seconds; and said second range of durations includes durations between about 15 seconds and about 45 seconds.

21. The system of claim 12 wherein:

said memory stores a first group of said secondary audiovisual programs and a second group of said secondary audiovisual programs;

each of said first and second groups of secondary audiovisual programs comprises at least one secondary audiovisual program; and said generator initiates playback without user input (a) of a secondary audiovisual program from said first group when initiation of playback without user input occurs prior to initiation of playback of said at least one primary audiovisual program in response to user selection of said graphic interface element, and (b) of a secondary audiovisual program from said second group when initiation of playback without user input occurs after initiation of playback of said at least one primary audiovisual program in response to user selection of said graphic interface element.

22. The system of claim 21 wherein said at least one audiovisual program in said second group comprises content in common with content of said at least one primary audiovisual program.

23. A method for playback of multiple audiovisual programs, said method comprising the steps of:

providing a graphical user interface for playback of audiovisual programs;

providing at least one primary audiovisual program for playback using said graphical user interface;

providing at least one secondary audiovisual program for playback using said graphical user interface;

providing in said graphical user interface a graphic interface element for initiating playback, in response to user selection of said graphic interface element, of one of said at least one primary audiovisual program;

associating at least one of said at least one secondary audiovisual program with said graphic interface element; and initiating playbacks, without user input, of said associated at least one of said at least one secondary audiovisual program prior to user selection of said graphic interface element, wherein said playbacks are initiated at pseudorandomly spaced time intervals that have a duration selected from an initial range of durations for an initial one of said pseudorandomly spaced time intervals occurring after a user first activates said graphical user interface and from a second range of durations for subsequent ones of said pseudorandomly spaced time intervals after said initial one of said pseudorandomly spaced time intervals.

24. The method of claim 23 wherein said initial range of durations includes a shorter minimum duration and a shorter maximum duration than said second range of durations.

25. The method of claim 24 wherein:

said initial range of durations includes durations between about 5 seconds and about 15 seconds; and said second range of durations includes durations between about 15 seconds and about 45 seconds.

26. The method of claim 23 wherein:

said step of providing at least one secondary audiovisual program comprises providing a first group of secondary audiovisual programs and a second group of secondary audiovisual programs;

each of said first group and said second group comprises at least one secondary audiovisual program; and said step of initiating playbacks without user input comprises (a) playing back a secondary audiovisual program from said first group when said step of initiating playbacks without user input occurs prior to initiation of playback of said at least one primary audiovisual program in response to user selection of said graphic interface element, and (b) playing back a secondary audiovisual program from said second group when said step of initiating playbacks without user input occurs after initiation of playback of said at least one primary audiovisual program in response to user selection of said graphic interface element.

27. The method of claim 26 wherein said at least one audiovisual program in said second group comprises content in common with content of said at least one primary audiovisual program.

28. The method of claim 26 wherein said associated at least one of said at least one secondary audiovisual program appears for at least a portion of the playbacks in a first region of said graphical user interface that is separate from a second region of said graphical user interface in which said graphic interface element appears.

29. A method for playback of multiple audiovisual programs, said method comprising the steps of:

providing a graphical user interface for playback of audiovisual programs;

11 providing at least one primary audiovisual program for playback using said graphical user interface;

providing at least one secondary audiovisual program for playback using said graphical user interface from one of a first group of secondary audiovisual programs and a second group of secondary audiovisual programs, wherein each of said first group and said second group comprises at least one secondary audiovisual program;

providing in said graphical user interface a graphic interface element for initiating playback, in response to user selection of said graphic interface element, of one of said at least one primary audiovisual program;

associating at least one of said at least one secondary audiovisual program with said graphic interface element; and initiating playback, without user input, of said associated at least one of said at least one secondary audiovisual program prior to user selection of said graphic interface element, wherein said associated at least one of said at least one secondary audiovisual program is from said first group when said step of initiating playback without user input occurs prior to initiation of playback of said at least one primary audiovisual program in response to user selection of said graphic interface element, and from said second group when said step of initiating playback without user input occurs after initiation of playback of said at least one primary audiovisual program in response to user selection of said graphic interface element.

30. The method of claim 29 wherein said initiating step comprises initiating playback based on passage of time.

31. The method of claim 30 wherein said initiating step comprises initiating playback of said associated at least one of said at least one secondary audiovisual program at temporally spaced intervals.

32. The method of claim 31 wherein said temporally spaced intervals are pseudorandomly spaced.

33. The method of claim 32 wherein each of said pseudorandomly spaced intervals has a duration selected from a range of durations.

34. The method of claim 33 wherein there is only one said range of durations, each of said pseudorandomly spaced intervals being selected from said one range of durations.

35. The method of claim 29 wherein said at least one audiovisual program in said second group comprises content in common with content of said at least one primary audiovisual program.

36. A system for playback of multiple audiovisual programs, said system comprising:

a display for playback of audiovisual programs;

memory for storing at least one primary audiovisual program and at least one secondary audiovisual program;

a graphical user interface generator for creating a graphical user interface on said display for controlling playback of said at least one primary audiovisual program and said at least one secondary audiovisual program, said generator providing in said graphical user interface a graphic interface element for initiating playback, in response to user selection of said graphic interface element, of one of said at least one primary audiovisual program; and a user input device for actuating said graphic interface element for initiating playback of said at least one primary audiovisual program; wherein:

at least one of said at least one secondary audiovisual program is associated with said graphic interface element; and

12 playbacks of said associated at least one of said at least one secondary audiovisual program are initiated by said generator without user input prior to user selection of said graphic interface element, wherein the playbacks are initiated at pseudorandomly spaced time intervals that have a duration selected from an initial range of durations for an initial one of said pseudorandomly spaced time intervals occurring after a user first activates said graphical user interface and from a second range of durations for subsequent ones of said pseudorandomly spaced time intervals after said initial one of said pseudorandomly spaced time intervals.

37. The system of claim 36 wherein said initial range of durations includes a shorter minimum duration and a shorter maximum duration than said second range of durations.

38. The system of claim 37 wherein:

said initial range of durations includes durations between about 5 seconds and about 15 seconds; and said second range of durations includes durations between about 15 seconds and about 45 seconds.

39. The system of claim 36 wherein:

said memory stores a first group of said secondary audiovisual programs and a second group of said secondary audiovisual programs;

each of said first group and said second group comprises at least one secondary audiovisual program; and said generator initiates playbacks without user input (a) of a secondary audiovisual program from said first group when initiation of playbacks without user input occurs prior to initiation of playback of said at least one primary audiovisual program in response to user selection of said graphic interface element, and (b) of a secondary audiovisual program from said second group when initiation of playbacks without user input occurs after an initiation of playback of said at least one primary audiovisual program in response to user selection of said graphic interface element.

40. The system of claim 39 wherein said at least one audiovisual program in said second group comprises content in common with content of said at least one primary audiovisual program.

41. The system of claim 39 wherein said associated at least one of said at least one secondary audiovisual program appears for at least a portion of said playbacks in a first region of said graphical user interface that is separate from a second region of said graphical user interface in which said graphical interface element appears.

42. A system for playback of multiple audiovisual programs, said system comprising:

a display for playback of audiovisual programs;

memory for storing at least one primary audiovisual program, a first group of secondary audiovisual programs, and a second group of secondary audiovisual programs, each of said first group and said second group comprising at least one secondary audiovisual program;

a graphical user interface generator for creating a graphical user interface on said display for controlling playback of said at least one primary audiovisual program and said at least one secondary audiovisual program, said generator providing in said graphical user interface a graphic interface element for initiating playback, in response to user selection of said graphic interface element, of one of said at least one primary audiovisual program; and a user input device for actuating said graphic interface element for initiating playback of said at least one primary audiovisual program wherein:

at least one of said at least one secondary audiovisual program is associated with said graphic interface element; and playback of said associated at least one of said at least one secondary audiovisual program is initiated by said generator without user input prior to user selection of said graphic interface element, wherein said associated at least one of said at least one secondary audiovisual program is from said first group when initiation of said playback without user input occurs prior to initiation of playback of said at least one primary audiovisual program in response to user selection of said graphic interface element, and from said second group when initiation of said playback without user input occurs after initiation of playback of said at least one primary audiovisual program in response to user selection of said graphic interface element.

43. The system of claim 42 wherein playback of said associated at least one of said at least one secondary audiovisual program is initiated based on passage of time.

44. The system of claim 43 wherein playback of said associated at least one of said at least one secondary audiovisual program is initiated at temporally spaced intervals.

45. The system of claim 44 wherein said temporally spaced intervals are pseudorandomly spaced.

46. The system of claim 45 wherein each of said pseudorandomly spaced intervals has a duration selected from a range of durations.

47. The system of claim 46 wherein there is only one said range of durations, each of said pseudorandomly spaced intervals being selected from said one range of durations.

48. The system of claim 42 wherein said at least one audiovisual program in said second group comprises content in common with content of said at least one primary audiovisual program.

* * * * *